Feb. 23, 1932.  G. E. ZAHN  1,846,932
VARIABLE SPEED HYDRAULIC TRANSMISSION
Filed Sept. 9, 1929   2 Sheets-Sheet 1
Fig. 1.
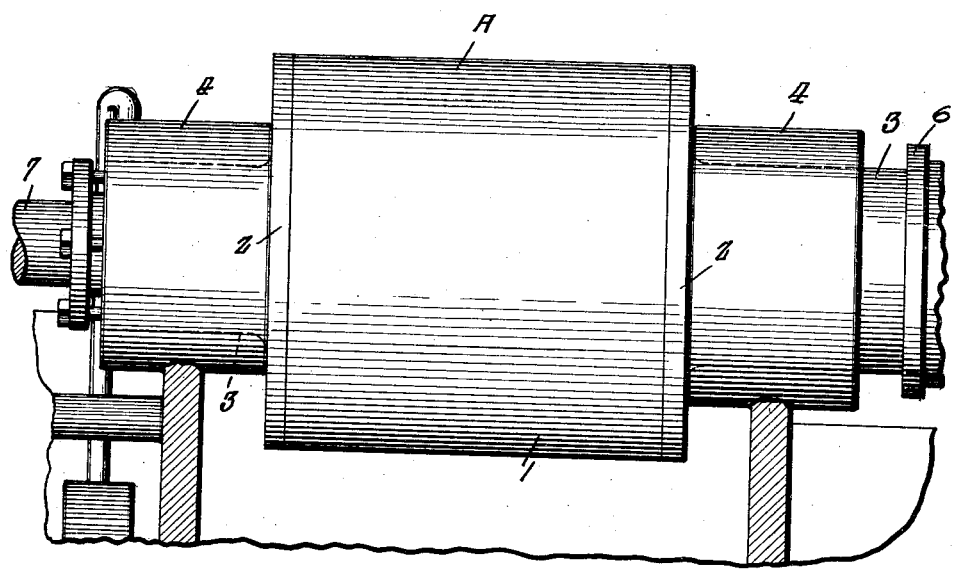
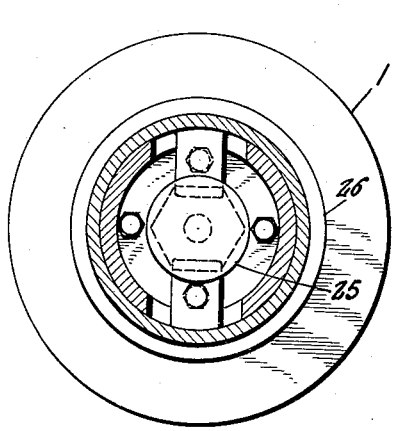
Fig. 3.
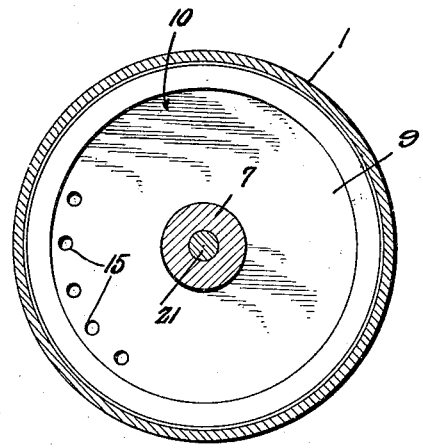
Fig. 4.
George E. Zahn,
INVENTOR
BY Vieta J. Evans
ATTORNEY Feb. 23, 1932.    G. E. ZAHN    1,846,932
VARIABLE SPEED HYDRAULIC TRANSMISSION
Filed Sept. 9, 1929    2 Sheets-Sheet 2

George E. Zahn,
INVENTOR
BY Victor J. Evans
ATTORNEY

Patented Feb. 23, 1932

1,846,932

UNITED STATES PATENT OFFICE

GEORGE EUGENE ZAHN, OF FREEDOM, PENNSYLVANIA

VARIABLE SPEED HYDRAULIC TRANSMISSION

Application filed September 9, 1929. Serial No. 391,263.

This invention relates to a hydraulic variable speed power transmission unit which may also be used as a brake, the general object of the invention being to provide a drive member having a ported casing thereon and a driven member having a casing thereon which encloses the first casing, with fluid operated means carried by one casing and adapted to engage the other casing whereby the driven member will rotate with the drive member at the same or any variable speed, according to the fluid pressure, with manually controlled means for controlling said pressure.

Another object of the invention is to so arrange and construct the parts that a simple, effective, compact and durable means of transmitting power from a drive member to a driven member is secured and one in which the driven member is connected with the drive member smoothly and without steps from a standing position to full speed.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a view with parts in section, this view showing the bearing members in elevation.

Figure 3 is a section on line 3—3 of Figure 2.

Figure 4 is a section on line 4—4 of Figure 2.

Figure 2:
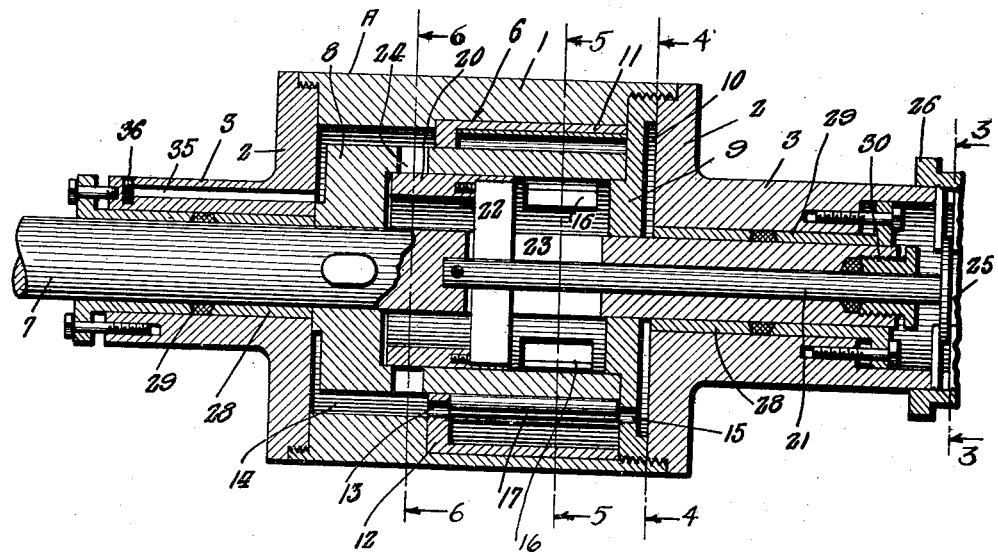
Figure 2 is a longitudinal sectional view through the driven and drive members.

In these views, A indicates a casing which constitutes a part of the driven member and comprises the cylinder 1, the end plates 2 which are suitably connected with the ends of the cylinder and the hubs 3 formed with the end plates. These hubs are rotatably arranged in the bearing members 4. The cylinder 1 is formed with a bore of two diameters, the large bore being eccentrically arranged to provide an eccentric chamber 6. A drive shaft 7 passes through the hub of the end plate 2 and a casing 8 is fastened to the shaft and is located within the casing A. One end of this casing 8 is closed and its other end is open, with said open end abutting a flanged plate 9 connected with the cylinder 1, with its flange forming a chamber 10 between the plate and the end plate 2. A sleeve 11 is placed in the eccentric part of the bore, with one end abutting the plate 9 and its other end abutting the shoulder formed at the junction of the two parts of the bore and this other end has a flange 12 thereon which contacts the cylinder 8, and this flange is provided with the bypass ports 13 which place the eccentric chamber in communication with the annular chamber 14 formed by the small part of the bore and the casing 8. The plate 9 is also provided with the bypass ports 15 which connect the eccentric chamber with the chamber 10.

Figures 5, 6:
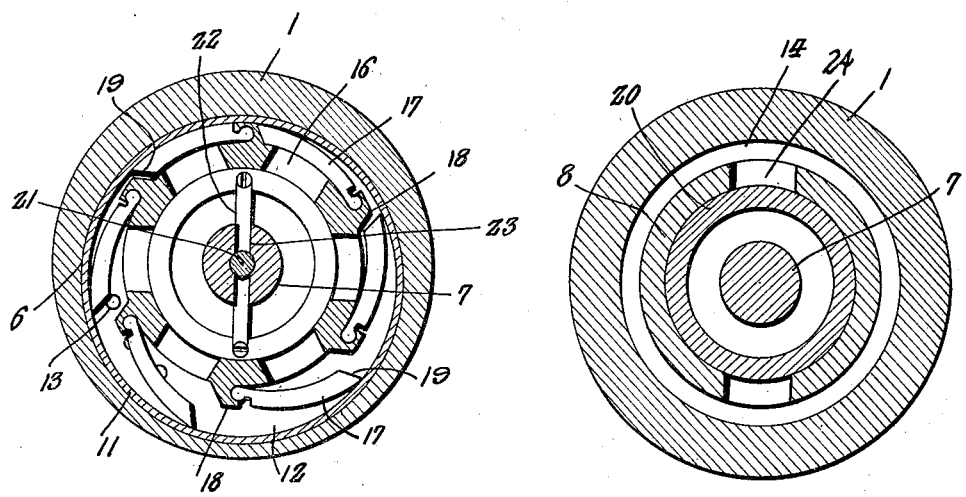
Figure 5 is a section on line 5—5 of Figure 2.
Figure 6 is a section on line 6—6 of Figure 2.

The casing 8 is provided with the ports 16 which place the interior of the casing in communication with the eccentric chamber. Arc-shaped wings 17 are each pivotally or hingedly connected at one end to projections 18 on the outer circumference of the cylinder 8, each wing having a beveled free end 19 and the projections 18 form recesses for receiving the wings when said wings are forced inwardly by the portions of the walls of the eccentric chamber which are closest to the axis of the device, as clearly shown in Figure 5. A tubular valve member 20 is slidably arranged in the casing 8 and is connected to a rod 21 which passes through a hollow part of the shaft 7 by a cross piece 22 which passes through a slot 23 in the shaft 7, so that longitudinal movement of the rod will cause movement of the valve member, this valve member being arranged to close or partly close the ports 16 when moved in one direction by the rod. In the casing 8 are ports 24, these serving as by-passes from certain portions of the chamber 6 to other portions of the same when covered by the valve 20 and also portions of this chamber with spaces between the chambers 8 and A.

The outer end of the rod 21 is provided with a circular head 25 which is engaged by parts of a ring 26 on the hub of the end plate 2, and this ring is operable by shifting lever (not shown) so that the rod 21 and the valve member 20 can be shifted by the manipulation of this lever without interfering with the rotary movement of the parts. Bearing members 28 are arranged between the hubs 3 and the shaft 7 and a packing gland 29 is associated with each hub for preventing leakage of the fluid in the device around the shaft 7. A packing gland 30 is also arranged in the shaft 7 for preventing leakage around the rod 21.

From the foregoing it will be seen that when the shaft 7 is rotated, the casing 8 will also be rotated and the walls of the eccentric chamber will cause these wings to move into and out of the recesses between the projections 18 as the casing 8 rotates. If the ports 16 are open, the wings will have free movement as the fluid can pass from the closing side to the opening side without interfering with the movement of the wings. Thus the casing A and the parts attached thereto will remain stationary as the casing 8 rotates therein. However, if the valve member 20 is moved to a position to entirely close the ports 16, the fluid is trapped in the eccentric chamber and the wings cannot move inwardly so that the casing A is locked to the casing 8 and therefore must rotate with said casing so that the driven member will rotate at the same speed as the drive member. When the valve member 20 is moved to a position to but partly close the ports, a certain amount of slippage will take place so that the driven member will rotate at a less speed than the drive member and this speed can be adjusted to any desired ratio by the proper adjustment of the valve member 20 over the ports 16. As will be seen, the bypasses 13 and 15 connect the eccentric chamber with the chambers 10 and 14 and any excess pressure on the packing glands, caused by leakage past the bearing surfaces on the closing side, is relieved by passing through the chambers and ports back into the eccentric chamber on the opening side. The bypasses 24 insure a supply of liquid under the wings as the closing action begins.

The purpose of these ports 13 and 15 is to allow any natural leakage past the wearing surfaces of the closing or pressure side to get back into the opening side without building up pressure between the two casings 1 and 8, which pressure would be exerted against the packing glands.

Another purpose of these ports 13 and 15 is to allow any fluid pumped into the space between the two casings 1 and 8 to get into the eccentric chamber on the opening side.

Any fluid within the casing 1, except that in the closing side of the eccentric chamber is free, regardless of the position of the valve 20, to enter the opening side.

While the valve 20 shuts off the ports 24 in one position of the valve, this does not affect the action of the unit, because when the valve is across the ports 24, the ports 16 are open on both the opening and closing sides and the fluid is free to flow directly across from the closing side to the opening side. The ports 24 could be through the end wall of casing 8 and function just as well as in the position they are shown. Their only purpose is to allow freedom for the fluid within the casing 8 to get into the opening side of the eccentric chamber through the chamber 14 and the ports 13.

The construction and arrangement of the parts thus gives all the fluid within the cylinder 1 (except that in the closing side) freedom to get under the wings on the opening side, regardless of the position of the valve 20. On the closing side, all the fluid is trapped there, except as released through the ports 16 by valve 20.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A device of the class described comprising a drive member including a casing, a driven member including a casing surrounding the first casing, said second casing having an eccentric chamber therein, the first casing having ports therein placing the interior thereof in communication with the eccentric chamber, fluid pressure operated means carried by the first casing and adapted to contact the walls of the eccentric chamber, fluid in the casings, a valve member for controlling the ports, bypass means connecting portions of the eccentric chamber with other portions thereof and portions of the eccentric chamber with a space between the two casings.

2. A device of the class described comprising a drive member including a casing, a driven member including a casing surrounding the first casing, said second casing having an eccentric chamber therein, the first casing having ports therein placing the interior thereof in communication with the eccentric chamber, fluid pressure operated means comprising pivoted wings carried by the first casing and adapted to contact the walls of the eccentric chamber, fluid in the casings, a valve member for controlling the ports, bypass means connecting portions of the eccentric chamber with other portions thereof and portions of the eccentric chamber with a space between the two casings, some of the by-pass means being controlled by the valve member.

3. A device of the class described comprising a drive member including a casing having main ports therein and bypass ports therein, a driven member including a casing surrounding the first mentioned casing, said second casing having a bore of two diameters, with its large bore eccentric, both portions of the bore being spaced from the first casing, with the space formed by the small part of the bore communicating with the bypass ports and the eccentric chamber being in communication with the main ports, wings connected with the first casing and arranged in the eccentric chamber, a ported part separating the eccentric chamber from the concentric chamber, passages connecting portions of the eccentric chamber together and a valve member for controlling the main ports.

In testimony whereof I affix my signature.

GEORGE EUGENE ZAHN.